(12) United States Patent
Moua

(10) Patent No.: US 10,893,156 B1
(45) Date of Patent: Jan. 12, 2021

(54) SCANNING AUTHORIZATION

(71) Applicant: KYOCERA Document Solutions, Inc., Osaka (JP)

(72) Inventor: Kevin Moua, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/556,071

(22) Filed: Aug. 29, 2019

(51) Int. Cl.
| | |
|---|---|
| *H04N 1/00* | (2006.01) |
| *G06K 9/48* | (2006.01) |
| *H04L 9/06* | (2006.01) |
| *G06K 9/00* | (2006.01) |

(52) U.S. Cl.
CPC ..... *H04N 1/00389* (2013.01); *G06K 9/00852* (2013.01); *G06K 9/48* (2013.01); *H04L 9/0637* (2013.01); *H04N 1/00204* (2013.01); *H04N 1/00538* (2013.01)

(58) Field of Classification Search
CPC ................................................ H04N 1/00389
USPC ........................................................ 358/1.15
See application file for complete search history.

(56) References Cited

U.S. PATENT DOCUMENTS

| | | | |
|---|---|---|---|
| 9,855,785 B1* | 1/2018 | Nagelberg | B42D 25/305 |
| 2003/0093525 A1* | 5/2003 | Yeung | H04N 1/00204 |
| | | | 709/225 |
| 2006/0206462 A1* | 9/2006 | Barber | G06F 16/3331 |
| 2009/0180698 A1* | 7/2009 | Ramani | G06K 9/2063 |
| | | | 382/219 |

* cited by examiner

*Primary Examiner* — Jacky X Zheng
(74) *Attorney, Agent, or Firm* — W. Eric Webostad

(57) ABSTRACT

Systems and methods relate generally to scan authorization. For example, a memory has stored therein at least one keyword in a word bank, at least one permission in at least one profile, and at least one action to be performed responsive to a scanning operation of a document including the at least one keyword. A scan file and a user identification associated therewith of the scanning operation are obtained. A recognition operation is performed on an image in the scan file. A check for the at least one keyword in a recognized content obtained from the image is performed. Responsive to recognizing the at least one keyword in the recognized content, a check for the at least one permission having the user identification is performed. The at least one action for the scanning operation is performed responsive to an outcome of the checking for the at least one permission.

20 Claims, 7 Drawing Sheets

SCANNING AUTHORIZATION

FIELD

The following description relates to document control. More particularly, the following description relates to scanning authorization.

BACKGROUND

Conventionally, a document may be scanned using a scanning device. Such scanning may not be checked for authorization to scan such a document, in contrast to authorization to use a scanner.

SUMMARY

In accordance with one or more below described examples, a method relating generally to scan authorization is disclosed. In such a method, a memory has stored therein at least one keyword in a word bank, at least one permission in at least one profile, and at least one action to be performed responsive to a scanning operation of a document including the at least one keyword. A scan file and a user identification associated therewith of the scanning operation are obtained. A recognition operation is performed on an image in the scan file. A check for the at least one keyword in a recognized content obtained from the image is performed. Responsive to recognizing the at least one keyword in the recognized content, a check for the at least one permission having the user identification is performed. The at least one action for the scanning operation is performed responsive to an outcome of the checking for the at least one permission.

In accordance with one or more below described examples, a system elating generally to scan authorization is disclosed. In such a system, a memory is configured to store program code, at least one keyword in a word bank, at least one permission in at least one profile, and at least one action to be performed responsive to a scanning operation of a document including the at least one keyword. A processor is coupled to the memory. The processor, in response to executing the program code, is configured to initiate operations for implementing a scanning authorization process, including: obtaining a scan file and a user identification associated therewith of the scanning operation; performing a recognition operation on an image in the scan file; checking for the at least one keyword in a recognized content obtained from the image; responsive to recognizing the at least one keyword in the recognized content, checking for the at least one permission having the user identification; and performing the at least one action for the scanning operation responsive to an outcome of the checking for the at least one permission.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims; but are for explanation and understanding only.

DETAILED DESCRIPTION

Figure 1:
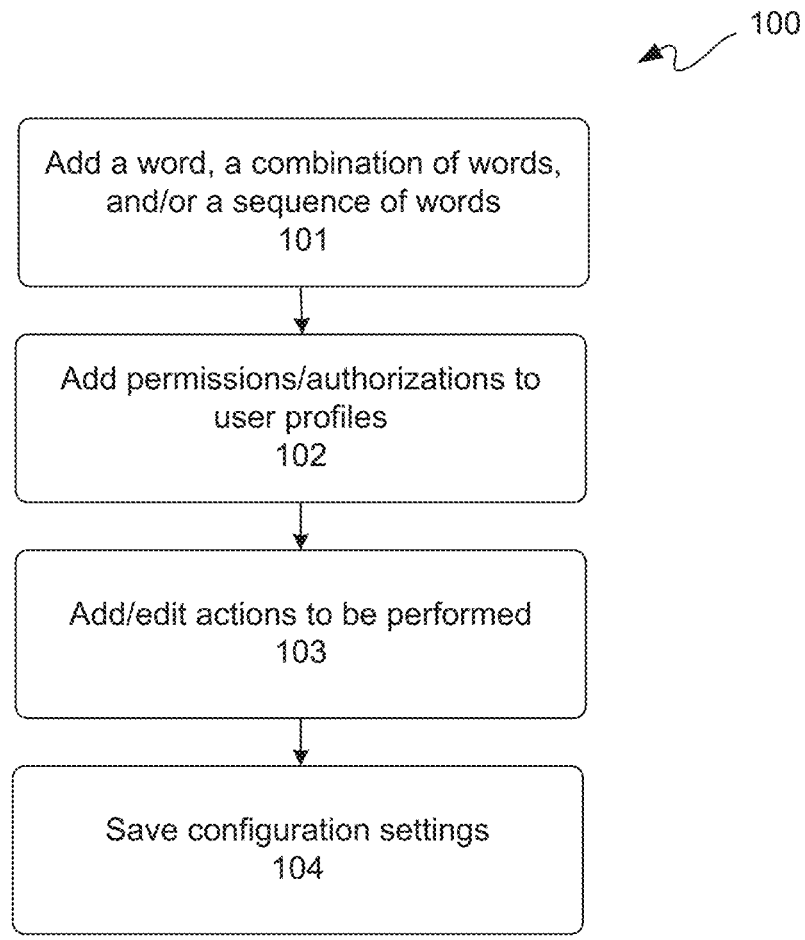
FIG. 1 is a flow diagram depicting an example of a word bank flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A user may be authorized to use a scanner, or a scanner may be used without any authorization. However, use of a scanner, whether authorized or not, is not the same as authorization to scan a document. A document may contain information which is not to be widely shared, or shared at all.

As described below in additional detail, scan authorization may be performed on a document apart from whether use of a scanner is authorized or not. Such scan authorization may be used to determine if such a document is allowed to be scanned, or more particularly allowed to be scanned by a user or user profile.

With the above general understanding borne in mind, various configurations for scan authorization systems and methods are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a flow diagram depicting an example of a word bank flow 100. In this example, word bank flow 100 is for optical character recognition ("OCR"). However, at least one recognition of optical character recognition, optical word recognition, intelligent character recognition, or intelligent word recognition on an image or a sequence of images may be performed. However, for purposes of clarity by way of example and not limitation, OCR is used in this example.

At operation 101, a word, a combination of words, and/or a sequence of words may be added to a software word bank, which word bank for purposes of storage of such word information may be a memory. Moreover, multiple words, combinations of words, and/or sequences of words may be added to a word bank at operation 101.

In this example, such memory is of a scanner device. For purposes of clarity by way of example and not limitation; such scanner device is of a printing device; namely a multi-function printer or MFP. However, in another example, a standalone scanner device may be used, or a networked standalone scanner device or MFP, as described below in additional detail.

At operation 102, one or more permissions or authorizations may be added to one or more user profiles. In this example, such permissions are for users to scan content having word information stored at operation 101 in accordance with corresponding user profiles. Such one or more permissions of one or more user profiles in this example are stored in memory of an MFP; however, in another example, such one or more permissions of one or more user profiles may be stored in a memory separate from such MFP, such as in network memory of a server for example. Such MFP may be in communication via a network with such server.

In another example, word information may likewise be stored in network memory of a server for example separate from memory of such MFP. However, for purposes of clarity by way of example and not limitation, it is assumed that word information added at operation 101 is stored in memory of an MFP having user profiles too.

This word information stored in a word bank may represent one or more keywords. Accordingly, at operation 101 at least one keyword may be stored in a word bank. An example of a keyword may be the word "CONFIDENTIAL" all in caps in a header or a footer on a document. However, this or another keyword, whether all in caps or lowercase or a combination thereof, may be used.

There may be different levels of permissions or authorizations corresponding to different user profiles. Furthermore, different keywords may be associated with different levels of permissions or authorizations. In another example, permissions or authorizations may be by individual or group, such as a team.

Figure 2:
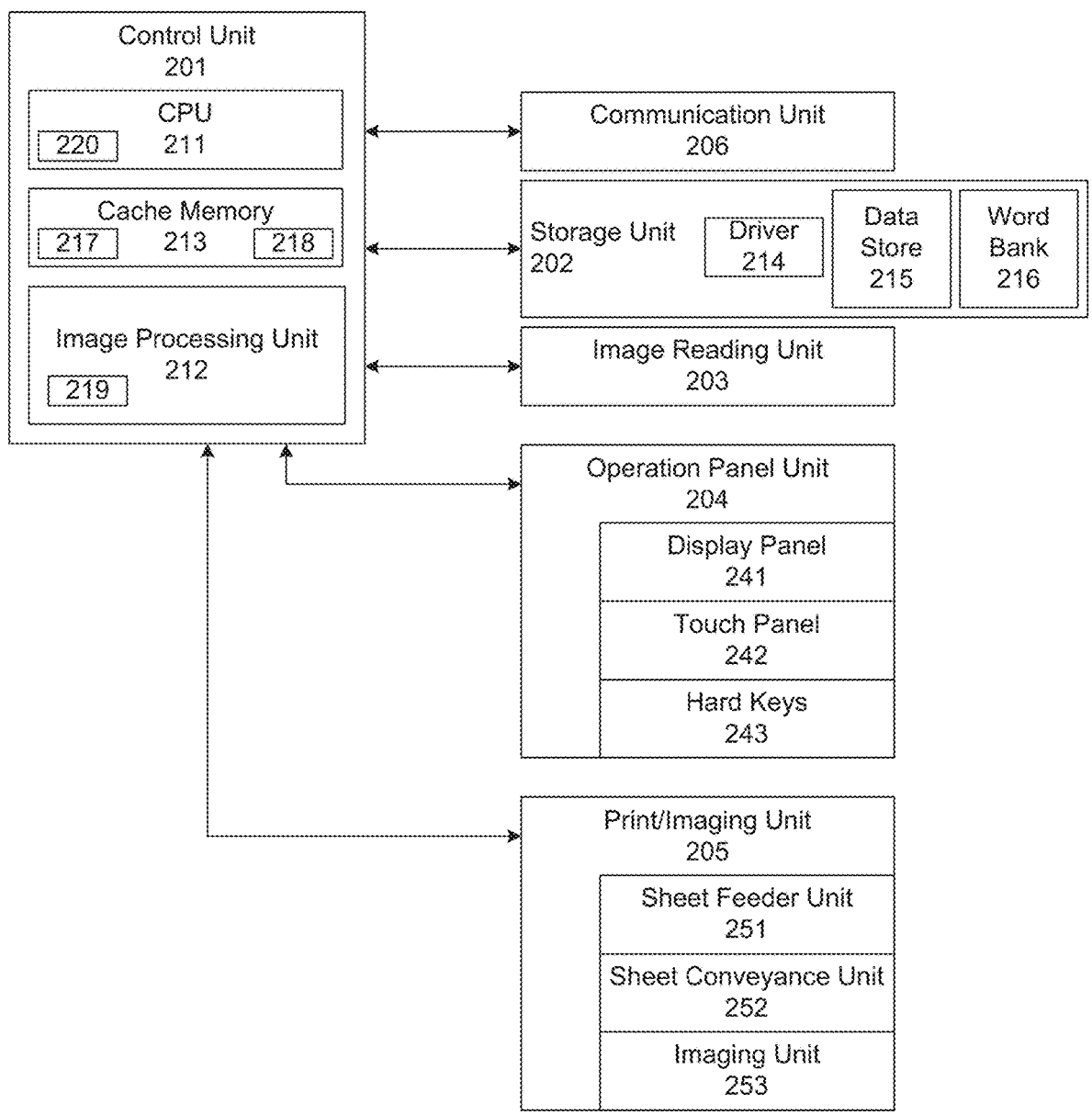
FIG. 2 is a block diagram depicting an example of a printing device.

FIG. 2 is a block diagram depicting an example of an MFP 200. MFP 200 is provided for purposes of clarity by way of non-limiting example. MFP 200 is an example of a data processor system or preprocessor subsystem, as an MFP may be configured to perform operation described herein or may be networked for performing one or more operations described here apart from MFP 200.

MFP 200 in this example includes a control unit 201, a storage unit 202, an image reading unit 203, an operation panel unit 204, a print/imaging unit 205, and a communication unit 206. Communication unit 206 may be coupled to a network for communication with other peripherals, mobile devices, computers, servers, and/or other electronic devices. In another example, control unit 201 may be separate from MFP 200.

Control unit 201 may include a CPU 211, an image processing unit 212, and cache memory 213. Storage unit 202 may include ROM, RAM, and large capacity storage memory, such as for example an HDD or an SSD. Storage unit 202 may store various types of data and control programs, including without limitation a printer driver 214.

In this example, storage unit 202 stores program code, such as driver 214, a data store 215, and a word bank 216. However, in other examples, one or more of data store 215 or word bank 216 may be stored in memory of a server in network communication with MFP 200.

Operation panel unit 204 may include a display panel 241, a touch panel 242, and hard keys 243. Print/imaging unit 205 may include a sheet feeder unit 251, a sheet conveyance unit 252, and an imaging unit 253. In this example, image processing unit 212 is configured for OCR. However, as previously described OCR and/or another type of recognition may be used.

Generally, for example, for an MFP a copy image processing unit, a scanner image processing unit, and a printer image processing unit may all be coupled to respective direct memory access controllers for communication with a memory controller for communication with a memory. Many known details regarding MFP 200 are not described for purposes of clarity and not limitation.

Word bank flow 100 is further described with simultaneous reference to FIGS. 1 and 2.

In this example, permissions for user profiles of operation 102 are stored in data store 215. However, in another example permissions for user profiles may be stored in memory of a server in networked communication with MFP 200. Again, even though an example of an MFP is used, a standalone scanner may be used in another example.

At operation 103, at least one action may be stored in data store 215. Such at least one action may be performed responsive to a scanning operation of MFP 200 of a document including at least one keyword in word bank 216, where such scanning operation is not permitted or authorized in accordance with a user profile of a user of MFP 200. Optionally, at operation 103, one or more actions to be performed for any or all unauthorized scans or users may be edited. Configuration settings may be saved at operation 104, such as one or more added keywords to word bank 216 and one or more permissions to user profiles in data store 215.

Figure 3:
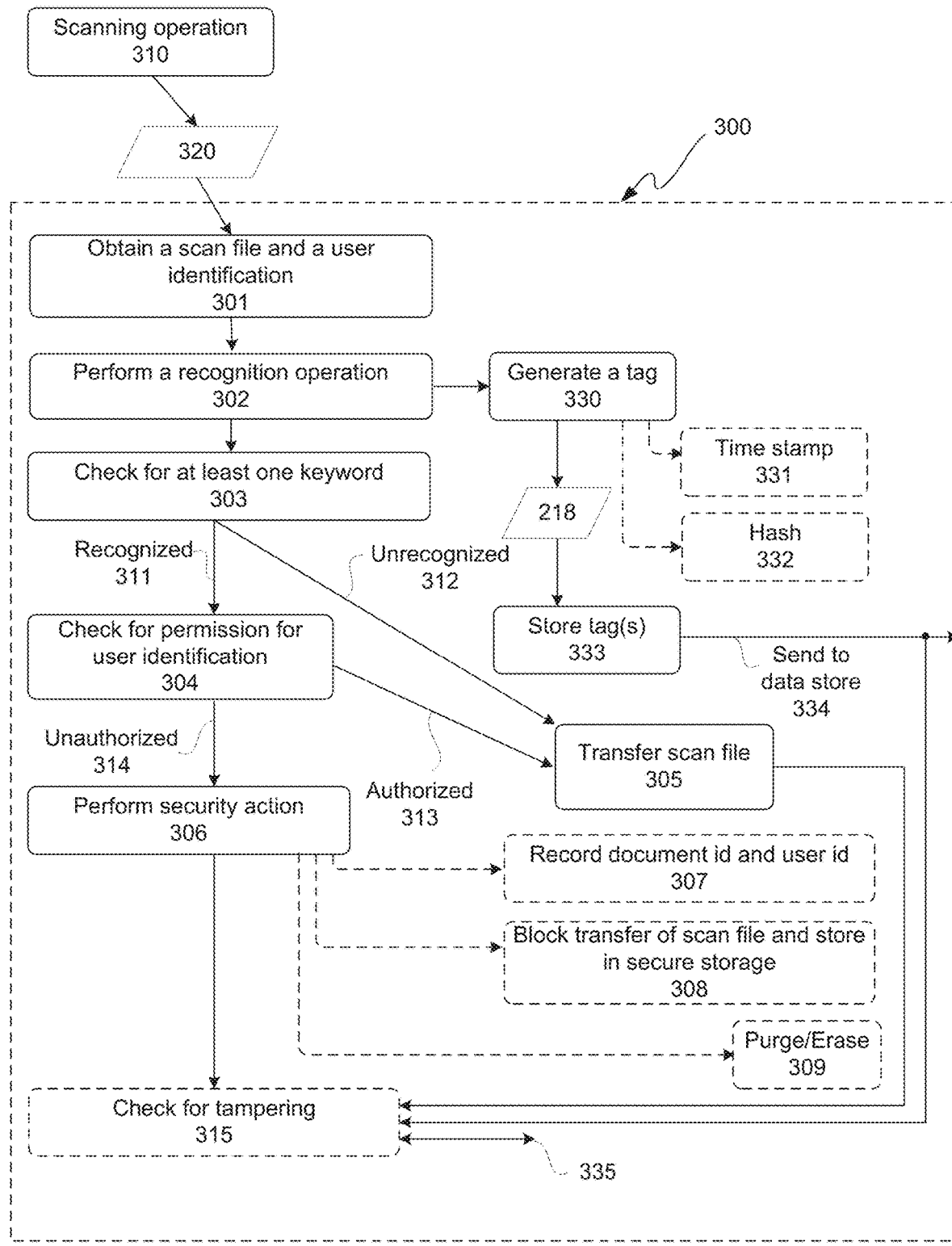
FIG. 3 is a flow diagram depicting an example of a scanning authorization flow.

FIG. 3 is a flow diagram depicting an example of a scanning authorization flow 300. Scanning authorization flow 300 is further described with simultaneous reference to FIGS. 1-3.

At operation 310, a user of a scanner, such as MFP 200 for example, may perform a scanning operation, such as to scan a document for example. A user may have to enter a user identification at operation 310 to perform such scanning operation. After scanning at operation 310, a scan file 320 having one or more images may be generated. Such scan file 320 may include information associated with such scan, namely scan information. Such scan information may include scan metadata, as well as such user identification. Scan metadata may include time of scan, number of pages, scanner settings for scan, and/or other scan metadata.

In response to obtaining at operation 301, a scan file 320 with a user identification associated therewith from a scanning operation 310, scanning authorization flow 300 may be triggered. Scanning authorization flow 300 may prevent transfer, at least temporarily, of such scan file 320, pending authorization.

At operation 302, a recognition operation on an image or images in scan file 320 may be performed. Such a recognition operation may be an OCR or other recognition operation as described elsewhere herein.

At operation 303, a check for at least one keyword in a word bank 216 may be performed for presence of such at least one keyword in a recognized content obtained from such recognition operation 302 performed on such image or images in scan file 320. If no keyword from word bank 216 is found or recognized in an image or images of scan file 320 at operation 303, then an unrecognized or not found branch 312 may be taken to allow a scan file 320 to be transferred at operation 305.

Such scan file 320 may be transferred to an address 217, such as for example an email address, a network address, a memory address, or another address, which may be specified by a user, Such an address 217 may be stored, with scan file 320, in cache memory 213. Along those lines, a scan file 320 may be sent in accordance with a transfer protocol to a destination. Examples of file transfer and network protocols that may be used include: File Transfer Protocol, Simple Mail Transfer Protocol, Hypertext Transfer Protocol, or Media Transport Protocol, among others.

It however, at operation 303 scanning authorization flow 300 recognizes or finds at least one keyword in a word bank 216 in presence of such recognized content obtained from recognition operation 302, then a recognized or found branch 311 may be taken to check for permission. At operation 304, a check for permission for a user identification in or associated with scan file 320 may be performed. Again, a user profile may indicate whether a user associated with such a user identification has authorization to scan a document containing one or more recognized keywords.

If as determined at operation 304 a user associated with a user identification for scan file 320 has permission to scan such a document, then an authorized branch 313 may be taken to transfer a scan file 320 at operation 305. As there may be different permissions for different levels of security, at least one permission may be checked for having a sufficient security level associated with a highest level of security associated with such at least one keyword.

If, however, as determined at operation 304 a user associated with a user identification for scan file 320 does not have permission to scan such a document, such as for example does not have a sufficient security level, then an unauthorized branch 314 may be taken to perform a security action at operation 306. Accordingly, an outcome of a checking operation 304 may indicate such scanning at operation 310 is either authorized or unauthorized.

A security action performed at operation 306 optionally may include a purging or erasing operation 309 of scan file 320 responsive to an outcome of checking operation 304 indicating an unauthorized scanning due to an absence of at least one permission sufficient to grant authorization for such scanning operation 310. However, in another example, a security action performed at operation 306 may be to optionally record such user identification used to perform such scanning operation 310, Optionally, a document identification, which may be part of scan metadata, and/or scan metadata may be recorded at operation 307. Such recordation operation 307 may be instead of or in addition to purge/erase operation 309.

In yet another example, a security action performed at operation 306 optionally may include blocking transfer at operation 308 of such scan file 320 and optionally storing such scan file 320 in a secure storage, such as of storage unit 202. In this option, such at least one action such as may be specified for a user profile includes prohibiting a completion of scanning operation 310 responsive to an outcome indicating such scanning operation is unauthorized for a user identification not being included in at least one permission of sufficient security level for such scanning operation. In another example, such security action at operation 306 may prohibit completion of scanning operation 310 to include at least one of blocking transfer at operation 308 of a scan file 320 from a scanner, namely from MFP 200 in this example, or purging of such scan file 320 from a memory of such scanner, such as purging from cache memory 213 for example. A blocking transfer operation 308 may optionally include storing a scan file in secure storage.

As described above, for a physical document scanned on a scanning device, OCR may be used to detect if such document contains any words from a target word bank. Authorized personnel may add combinations of words to a word bank to detect documents containing sensitive or confidential information during scan operations. Authorized personnel may grant permission privileges to certain users or user profiles. Authorized personnel may decide any one or more actions to be performed for a user or user profile if an OCR process detects any target word or words from a target word bank in a scan file from a scanning operation.

If an OCR process does not detect any target word or words, a scanning device may proceed with a file transfer of scan file. However, if an OCR process detects any target word or words, additional steps may be taken before, if any, file transfer, depending on which user or user profile invoked a scanning operation.

Scanning authorization flow 300 may prohibit unauthorized users from scanning confidential or sensitive documents, and may record an auditable history of each user who has attempted to do so. Further, electronic data may provide verification to identify modifications made from a physical document.

Along those lines, an optional tampering check operation 315 may be performed, Tampering check operation 315 may compare a tag 218 of a current scan file 320, such as sent 334 to a data store, to a historical tag 335 record of such document obtained from such data store, Along those lines, a historical tag 335 of such document may be obtained from a database for comparison as part of tampering check operation 315.

Regardless whether or not scanning authorization flow 300 prohibits completion of a scanning operation or not, scanning authorization flow 300 may generate or create an electronic file or message, referred to as a tag 218, at operation 330, which may be performed after recognition operation 302. A tampering check operation 315 may follow from operations 305 or 306. A tampering check 315 may be a restriction on transfer of a scan file 320 at operation 305. A tag 218 may be temporarily stored in cache memory 213 at operation 333 before being sent 334 to a database or other data repository or data store such as may be associated with a network server.

A tag 218 may contain scan information, such as for example electronic and other metadata, associated with a current scan operation, Each such tag 218 may be sent on the network to an authorized server to be stored in a database for example, where an administrative user can search and query tags to gather information for data science reasons. A tag 218 may contain: a file name of a scan file 320; a summary or listing of keywords of documents such as based on OCR; a destination location or address for transfer of a scan file 320 (e.g., an e-mail or other address of a recipient; a computer/server hostname, destination network address(es), folder directory, and/or user); a source location or address of a scan file 320 (e.g., hostname, source network address(es), and/or geo-location information of a scanning device). Machine learning may be used to identify what types of keywords should be summarized, such as for example documents containing attorney-client, confidential, proprietary, sensitive, or secret, among other possible terms.

Tags 218 may be used in a blockchain. In this example, a consensus protocol is Proof of Estimated Time; however, in another example, another protocol associated with construction of a blockchain may be used. In this example, optionally tag 218 generation may further include a time stamping operation 331 to generate a timestamp by a timestamp function 219 of image processing unit 212 for a tag 218. Such a timestamp may be for a scanning operation 310 for example.

Furthermore, in this example, optionally a hash may be generated by hash function 220 of CPU 211 at hashing operation 332 for an OCR of one or more scanned images of scan file 320. Such hashing operation 332 may be limited to recognized content from an OCR of one or more scanned images of scan file 320. However, such hashing operation 332 may additionally take in one or more forms of metadata associated with a tag 218, such as may include previously described examples of metadata.

Figure 4:
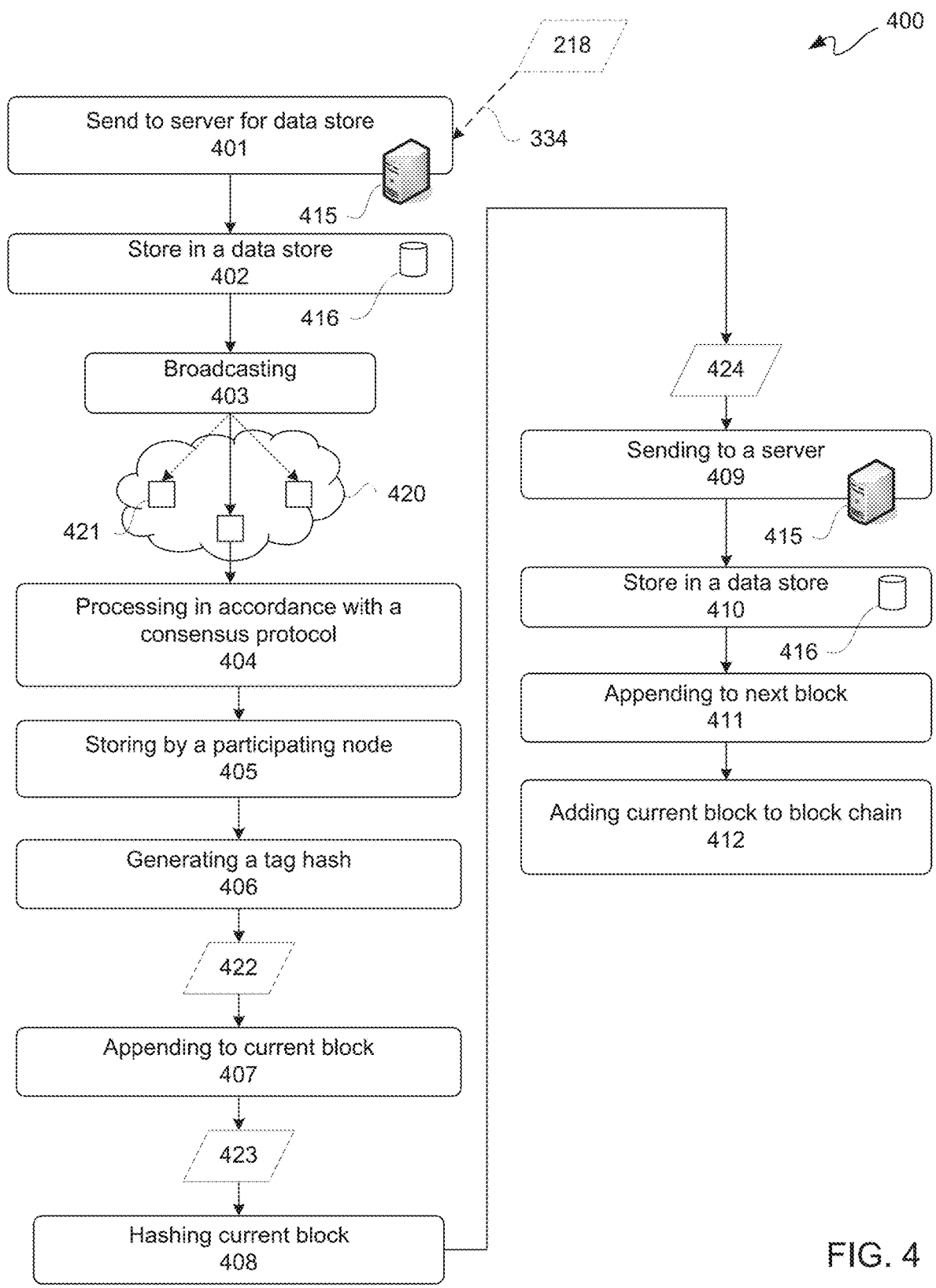
FIG. 4 is a flow diagram depicting an example of a blockchain flow.

FIG. 4 is a flow diagram depicting an example of a blockchain flow 400, In this example, a tag 218 may be sent to a server 415 of a blockchain network 420 at operation 401, consistent with sending a tag 318 at operation 334 to a data store of scanning authorization flow 300 of FIG. 3.

At operation 402, such tag 218 may be stored in a data store 416 in communication with such server 415 for subsequent access to scan information of such tag. Again, scan information may include: a hostname of a scanning device used in a scanning operation, a destination location for a scan file, a timestamp associated with such scanning operation, and a hash including content obtained from a recognition operation performed on scanned content. Such a recognition operation may include at least one of OCR, optical word recognition, intelligent character recognition, or intelligent word recognition on the image.

At operation 403, such a tag 218 may be broadcast by server 415 to participating nodes 421 in a blockchain network 420. Along those lines, at operation 404 and subsequent operations, each such participating node 421 may process such tag 218 in accordance with a consensus protocol.

At operation 405, each participating node may store such tag 218. Each networked device, such a printing device, a computer, motherboard, and so on, in a blockchain network 420 generally may join a blockchain in such network by running a blockchain program, namely a program that sets up a device for handling blockchain traffic and performing blockchain computations.

Such participating nodes may include a hash function, such as hash function 332 of FIG. 3 for example, to generate at operation 406 a hash of such tag, namely a tag hash 422. At operation 407, such tag hash may be appended to a current block 423 of a blockchain by such a participating node. A current block 423 of a blockchain may generally be thought of as a hash tag table.

At operation 408, such current block 423 or hash tag table 423 may have contents thereof hashed, such as by hash function 332 of FIG. 3 for example, by such a participating node to provide a block hash 424. At operation 409, such block hash 424 may be sent from such a participating node 421 in a blockchain network 420 to a server 415 in such blockchain network 420.

At operation 410, such block hash 424 may be stored in a data store 416 in communication with server 415. Such block hash 424 may be stored in previously empty block fields corresponding to entries in a current block represented by such block hash.

At operation 411, such block hash 424 may be appended to a next block in a blockchain. At operation 412, a current block may be added to a blockchain.

In the above example, it has been assumed that MFP 200 is not part of a blockchain; however, in another example a printing device, such as MFP 200 for example, may be part of a blockchain. Furthermore, while a printing device may be configured to perform recognition, such as OCR for example, such recognition in another example may be performed by a backend application in a cloud in network communication with a printing device.

A printing device may be configured to perform a hashing operation. Along those lines, a printing device may have a multi-core processor, a system-on-chip such as for example a Field Programmable Gate Array, a math co-processor, and/or other integrated circuits for performing a hashing function. Because a printer may be idle for an extended period, an ability to offload computationally complex tasks such as hashing may be beneficial to network performance.

In the above example, a blockchain, such as for example an enterprise-level blockchain, may be used to provide an audit trail for a scanning authorization flow. Along those lines, such a blockchain may, but need not, rise to the level of a financial transaction blockchain, such as for a digital currency such as bitcoins or the like for example.

A blockchain may be used to create an immutable audit history of instances when someone scans sensitive/confidential documents. After OCR detection for example, a scanning device may send a generated tag to a server and then to participating nodes or directly to participating nodes of such blockchain, where an unfinished block appends such tag to its list of entries. Workers of a blockchain may add such block to the end of a blockchain once such block reaches a threshold size limit or holds a threshold number of tags.

A separate process may be used to implement a blockchain explorer to decrypt and view contents of a blockchain, including information recorded in tags. Such a process may be used to implement a search query so authorized users can search for a tag based off various criteria, including providing a list of result tags that meet a search query. Authorized users can then view metadata provided by result tags. This process may be used to perform the same hash function on such tag to a hash function performed on data collected through OCR for example on electronic documents to create a tag hash. Such a newly generated hash can then be compared to a stored and retrieved tag hash of a queried to verify correctness, namely whether an electronic document has been modified from an original form thereof, as part of tampering check operation 315 of FIG. 3 for example.

Along those lines, educational institutions might use this technology to monitor academic integrity. Academic integrity may include scanning solution key documentation and verifying that documents have not been tampered. Medical businesses may use this technology to monitor sensitive documents containing patient information. Law firms may benefit from this technology, such as for example where sensitive physical documents can be prevented from being digitalized.

While the above description has been in terms of a scanning device of a printer, any device with a scanning capability may be used. For example, a smart phone camera may be a scanning device.

Because one or more of the examples described herein may be implemented in using a network, such as for a cloud-based SaaS implementation, or a computing system, as well as a mobile device, a detailed description of examples of each is provided. However, it should be understood that other configurations of one or more of these examples may benefit from the technology described herein.

Figure 5:
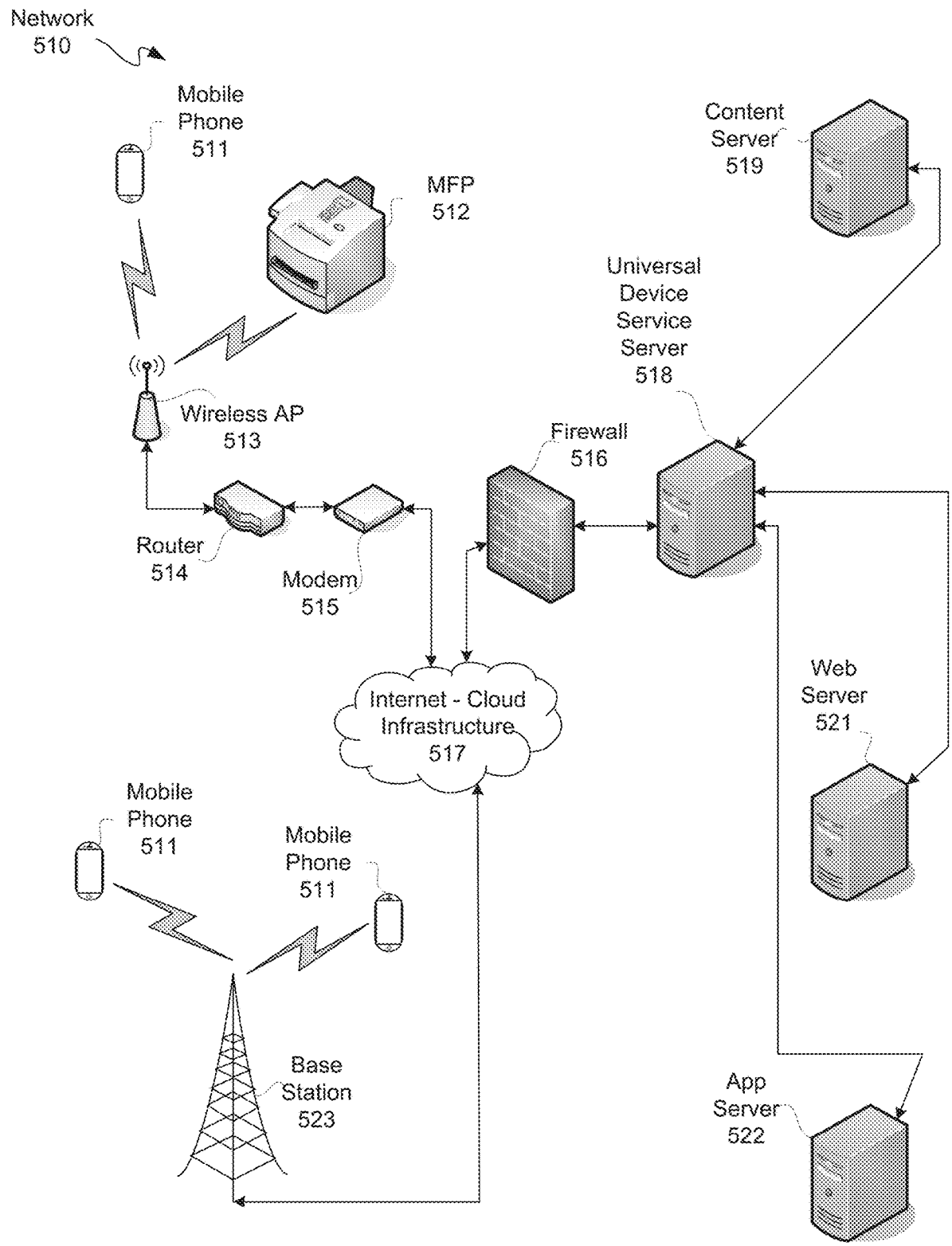
FIG. 5 is a pictorial diagram depicting an example of a network.

FIG. 5 is a pictorial diagram depicting an example of a network 510, which may be used to provide an SaaS platform for hosting a service or micro service for use by a user device, as described herein. Along those lines, network 510 may include one or more mobile phones 511-1, pads 511-2, notebooks 511-3, and/or other web-usable devices 511 in wired and/or wireless communication with a wired and/or wireless access point ("AP") 513 connected to or of a wireless router. Furthermore, one or more of such web-usable wireless devices 511 may be in wireless communication with a base station 523. Additionally, a desktop computer 511-4 and/or an MFP 511-5, each of which may be web-usable devices, may be in wireless and/or wired communication to and from router 514.

Wireless AP 513 may be connected for communication with a router 514, which in turn may be connected to a modem 515. Modem 515 and base station 523 may be in communication with an Internet-Cloud infrastructure 517, which may include public and/or private networks.

A firewall 516 may be in communication with such an Internet-Cloud infrastructure 517. Firewall 516 may be in communication with a universal device service server 518. Universal device service server 518 may be in communication with a content server 519, a web server 524, and/or an app server 522. App server 522, as well as a network 510, may be used for downloading an app or one or more components thereof for accessing and using a service or a micro service as described herein.

Figure 6:
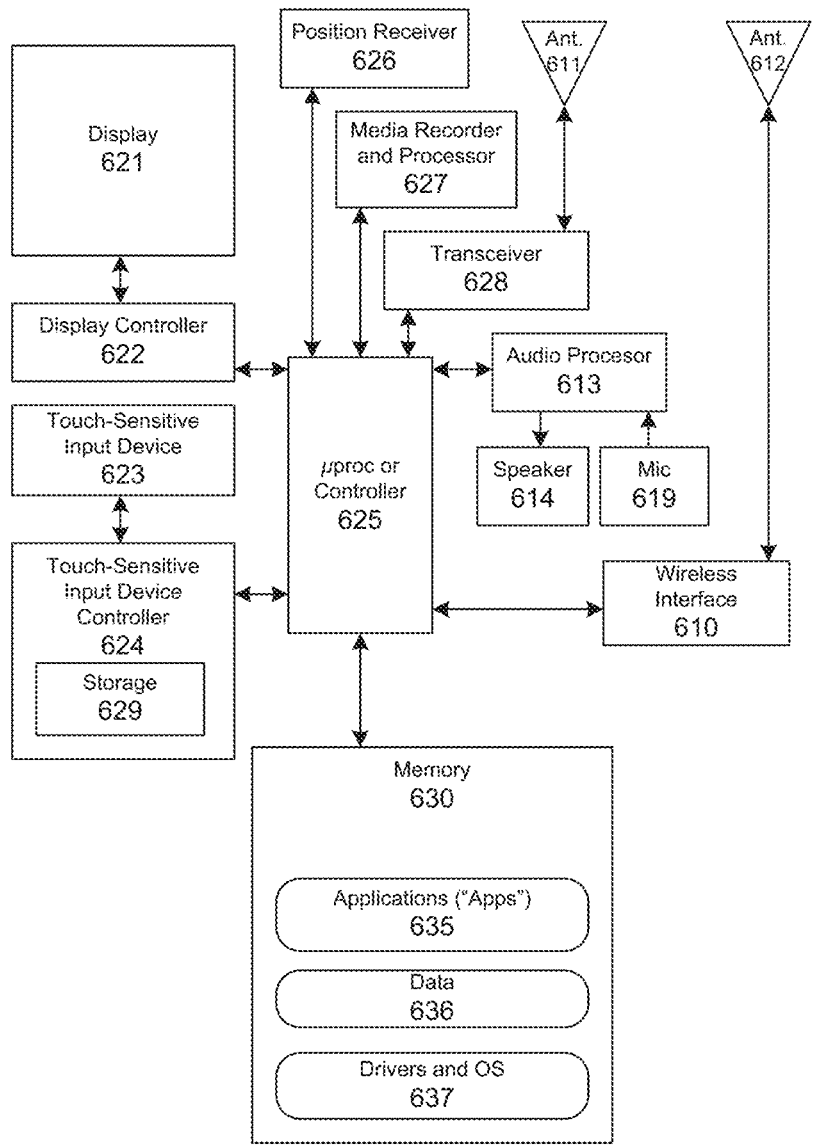
FIG. 6 is a block diagram depicting an example of a portable communication device.

FIG. 6 is block diagram depicting an example of a portable communication device ("mobile device") 600. Mobile device 600 may be an example of a smart phone, as previously described.

Mobile device 600 may include a wireless interface 610, an antenna 611, an antenna 612, an audio processor 613, a speaker 614, and a microphone ("mic") 619, a display 621, a display controller 622, a touch-sensitive input device 623, a touch-sensitive input device controller 624, a microprocessor or microcontroller 625, a position receiver 626, a media recorder 627, a cell transceiver 628, and a memory or memories ("memory") 630.

Microprocessor or microcontroller 625 may be programmed to control overall operation of mobile device 600. Microprocessor or microcontroller 625 may include a commercially available or custom microprocessor or microcontroller.

Memory 630 may be interconnected for communication with microprocessor or microcontroller 625 for storing programs and data used by mobile device 600. Memory 630 generally represents an overall hierarchy of memory devices containing software and data used to implement functions of mobile device 600, Data and programs or apps as described hereinabove may be stored in memory 630.

Memory 630 may include, for example, RAM or other volatile solid-state memory, flash or other non-volatile solid-state memory, a magnetic storage medium such as a hard disk drive, a removable storage media, or other suitable storage means. In addition to handling voice communications, mobile device 600 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 630 stores drivers, such as I/O device drivers, and operating system programs ("OS") 637. Memory 630 stores application programs ("apps") 635 and data 636. Data may include application program data.

I/O device drivers may include software routines accessed through microprocessor or microcontroller 625 or by an OS stored in memory 630. Apps, to communicate with devices such as the touch-sensitive input device 623 and keys and other user interface objects adaptively displayed on a display 621, may use one or more of such drivers.

Mobile device 600, such as a mobile or cell phone, includes a display 621. Display 621 may be operatively coupled to and controlled by a display controller 622, which may be a suitable microcontroller or microprocessor programmed with a driver for operating display 621.

Touch-sensitive input device 623 may be operatively coupled to and controlled by a touch-sensitive input device controller 624, which may be a suitable microcontroller or microprocessor. Along those lines, touching activity input via touch-sensitive input device 623 may be communicated to touch-sensitive input device controller 624. Touch-sensitive input device controller 624 may optionally include local storage 629.

Touch-sensitive input device controller 624 may be programmed with a driver or application program interface ("API") for apps 635. An app may be associated with a service, as previously described herein, for use of a SaaS. One or more aspects of above-described apps may operate in a foreground or background mode.

Microprocessor or microcontroller 625 may be programmed to interface directly touch-sensitive input device 623 or through touch-sensitive input device controller 624. Microprocessor or microcontroller 625 may be programmed or otherwise configured to interface with one or more other interface device(s) of mobile device 600. Microprocessor or microcontroller 625 may be interconnected for interfacing with a transmitter/receiver ("transceiver") 628, audio processing circuitry, such as an audio processor 613, and a position receiver 626, such as a global positioning system ("GPS") receiver. An antenna 611 may be coupled to transceiver 628 for bi-directional communication, such as cellular and/or satellite communication.

Mobile device 600 may include a media recorder and processor 627, such as a still camera, a video camera, an audio recorder, or the like, to capture digital pictures, audio and/or video. Microprocessor or microcontroller 625 may be interconnected for interfacing with media recorder and processor 627. Image, audio and/or video files corresponding to the pictures, songs and/or video may be stored in memory 630 as data 636.

Mobile device 600 may include an audio processor 613 for processing audio signals, such as for example audio information transmitted by and received from transceiver 628. Microprocessor or microcontroller 625 may be interconnected for interfacing with audio processor 613. Coupled to audio processor 613 may be one or more speakers 614 and one or more microphones 619, for projecting and receiving sound, including without limitation recording sound, via mobile device 600. Audio data may be passed to audio processor 613 for playback. Audio data may include, for example, audio data from an audio file stored in memory 630 as data 636 and retrieved by microprocessor or microcontroller 625. Audio processor 613 may include buffers, decoders, amplifiers and the like.

Mobile device 600 may include one or more local wireless interfaces 610, such as a WiFi interface, an infrared transceiver, and/or an RF adapter. Wireless interface 610 may provide a Bluetooth adapter, a WLAN adapter, an Ultra-Wideband ("UWB") adapter, and/or the like. Wireless interface 610 may be interconnected to an antenna 612 for communication. As is known, a wireless interface 610 may be used with an accessory, such as for example a hands-free adapter and/or a headset. For example, audible output sound corresponding to audio data may be transferred from mobile device 600 to an adapter, another mobile radio terminal, a computer, or another electronic device. In another example, wireless interface 610 may be for communication within a cellular network or another Wireless Wide-Area Network (WWAN).

Figure 7:
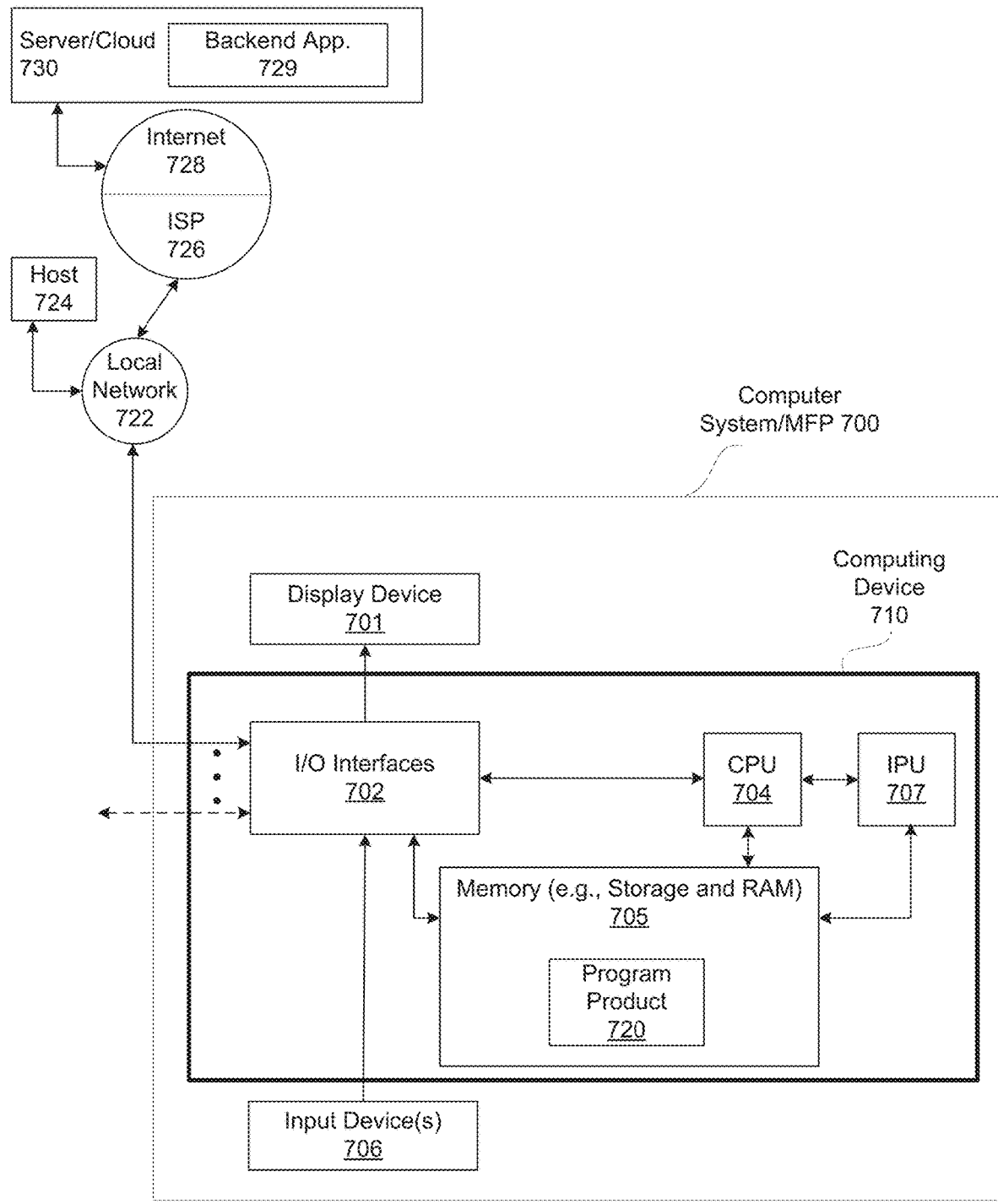
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701 such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") or graphics processing unit ("GPU") 707 coupled to CPU 704 and one or more peripheral cards 709 coupled to I/O interface 702. Along those lines, programmed computing device 710 may include graphics memory 706 coupled to optional GPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIG"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver; one or more amplifiers, a tuner, one or more oscillators, a digital signal processor, a CODEC chipset, memory, and the like. In some implementations; wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 602.11 a, IEEE 602.11b, IEEE 602.11g and/or IEEE 602.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/CPRS; UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
    storing in a memory at least one keyword in a word bank, at least one permission in at least one profile, and at least one action to be performed responsive to a scanning operation of a document including the at least one keyword;
    obtaining a scan file and a user identification associated therewith of the scanning operation;
    performing a recognition operation on an image in the scan file;
    checking for the at least one keyword in a recognized content obtained from the image;
    responsive to recognizing the at least one keyword in the recognized content, checking for the at least one permission having the user identification to determine whether a user associated with the user identification is authorized to perform the scanning operation; and
    performing the at least one action for the scanning operation responsive to an outcome of the checking for the at least one permission:
    wherein the at least one action comprises:
        allowing a completion of the scanning operation responsive to the outcome indicating the scanning operation is authorized by having the user identification including the at least one permission; and
        prohibiting a completion of the scanning operation responsive to the outcome indicating the scanning operation is unauthorized by the user identification not being included in the at least one permission.

2. The method according to claim 1, wherein:
    the scanner is of a printer; and
    the recognition operation includes an optical recognition operation.

3. The method according to claim 1, further comprising sending the scan file to a destination responsive to the allowing of the completion of the scanning operation; and
    responsive to the prohibiting of the completion of the scanning operation, performing at least one of:
        blocking transfer of the scan file from a scanner; or
        purging of the scan file from the memory of the scanner.

4. The method according to claim 1, further comprising generating a tag including scan information associated with the scanning operation.

5. The method according to claim 4, wherein the generating of the tag includes hashing at least the recognized content to generate a hash.

6. The method according to claim 5, further comprising:
    sending the tag to a server; and
    storing in a data store the tag for subsequent access to the scan information.

7. The method according to claim 6, wherein the scan information includes: a hostname of a scanning device used in the scanning operation, a destination location for the scan file, a timestamp associated with the scanning operation, and the hash.

8. The method according to claim 6, wherein the checking comprises performing at least one of optical character recognition, optical word recognition, intelligent character recognition, or intelligent word recognition on the image.

9. The method according to claim 6, further comprising:
broadcasting the tag to participating nodes in a blockchain network; and
processing the tag by the participating nodes in accordance with a consensus protocol.

10. The method according to claim 9, further comprising:
storing the tag in each of the participating nodes;
generating with a hash function by a participating node of the participating nodes a tag hash of the tag;
appending the tag hash to a current block for a blockchain by the participating node;
hashing contents of the current block by the participating node to provide a block hash;
sending the block hash from the participating node to the server; and
storing the block hash in the data store in previously empty block fields corresponding to entries in the current block represented by the block hash.

11. The method according to claim 10, further comprising:
appending the block hash to a next block; and
adding the current block to the blockchain.

12. The method according to claim 6, wherein:
the scan information includes a hostname of a scanning device used in the scanning operation; and
the scanning device is of a multi-function printer.

13. A scanning authorization system, comprising:
a memory to store program code, at least one keyword in a word bank, at least one permission in at least one profile, and at least one action to be performed responsive to a scanning operation of a document including the at least one keyword; and
a processor coupled to the memory, wherein the processor, in response to executing the program code, is configured to initiate operations for implementing a scanning authorization process, including:
obtaining a scan file and a user identification associated therewith of the scanning operation;
performing a recognition operation on an image in the scan file;
checking for the at least one keyword in a recognized content obtained from the image;
responsive to recognizing the at least one keyword in the recognized content, checking for the at least one permission having the user identification to determine whether a user associated with the user identification is authorized to perform the scanning operation; and
performing the at least one action for the scanning operation responsive to an outcome of the checking for the at least one permission.

14. The system according to claim 13, wherein the scanning authorization process further comprises generating a tag including scan information associated with the scanning operation.

15. The system according to claim 14, wherein the generating of the tag includes hashing at least the recognized content to generate a hash.

16. The system according to claim 15, wherein the hashing is performed by a multi-function printer having a scanner device and having the processor and the memory.

17. The system according to claim 15, wherein the scanning authorization process further comprises:
sending the tag to a server; and
storing in a data store the tag for subsequent access to the scan information.

18. The system according to claim 15, wherein the scanning authorization process further comprises:
broadcasting the tag to participating nodes in a blockchain network; and
processing the tag by the participating nodes in accordance with a consensus protocol.

19. The system according to claim 18, wherein the scanning authorization process further comprises:
storing the tag in the participating nodes;
generating with a hash function by a participating node of the participating nodes a tag hash of the tag;
appending the tag hash to a current block for a blockchain by the participating node;
hashing contents of the current block by the participating node to provide a block hash;
sending the block hash from the participating node to the server;
storing the block hash in the data store in previously empty block fields corresponding to entries in the current block represented by the block hash;
appending the block hash to a next block; and
adding the current block to the blockchain.

20. A method, comprising:
storing in a memory at least one keyword in a word bank, at least one permission in at least one profile, and at least one action to be performed responsive to a scanning operation of a document including the at least one keyword;
obtaining a scan file and a user identification associated therewith of the scanning operation;
performing a recognition operation on an image in the scan file;
checking for the at least one keyword in a recognized content obtained from the image;
responsive to recognizing the at least one keyword in the recognized content, checking for the at least one permission having the user identification; and
performing the at least one action for the scanning operation responsive to an outcome of the checking for the at least one permission;
generating a tag including scan information associated with the scanning operation;
wherein the generating of the tag includes hashing at least the recognized content to generate a hash;
sending the tag to a server;
storing in a data store the tag for subsequent access to the scan information;
broadcasting the tag to participating nodes in a blockchain network;
processing the tag by the participating nodes in accordance with a consensus protocol;
storing the tag in each of the participating nodes;
generating with a hash function by a participating node of the participating nodes a tag hash of the tag;
appending the tag hash to a current block for a blockchain by the participating node;
hashing contents of the current block by the participating node to provide a block hash;

sending the block hash from the participating node to the server; and storing the block hash in the data store in previously empty block fields corresponding to entries in the current block represented by the block hash.

\* \* \* \* \*